United States Patent
Ouderkirk (10) Patent No.: US 11,156,706 B2
(45) Date of Patent: Oct. 26, 2021

(54) MULTI-STATIC FREQUENCY DIVERSE WAVEFORM (MFDW)

(71) Applicant: Raytheon Company, Waltham, MA (US)

(72) Inventor: Gregg D. Ouderkirk, Fort Ann, NY (US)

(73) Assignee: Raytheon Company, Waltham, MA (US)

( * ) Notice: Subject to any disclaimer, the term of this patent is extended or adjusted under 35 U.S.C. 154(b) by 239 days.

(21) Appl. No.: 16/127,499

(22) Filed: Sep. 11, 2018

(65) Prior Publication Data

US 2020/0142046 A1    May 7, 2020

Related U.S. Application Data (60) Provisional application No. 62/558,397, filed on Sep. 14, 2017.

(51) Int. Cl.
| | |
|---|---|
| *G01S 13/00* | (2006.01) |
| *G01S 7/282* | (2006.01) |
| *G01S 7/295* | (2006.01) |
| *G01S 7/41* | (2006.01) |
| *G01S 13/72* | (2006.01) |

(52) U.S. Cl.
CPC ............ *G01S 13/003* (2013.01); *G01S 7/282* (2013.01); *G01S 7/295* (2013.01); *G01S 7/415* (2013.01); *G01S 13/723* (2013.01)

(58) Field of Classification Search
CPC ........ G01S 13/003; G01S 7/282; G01S 7/295; G01S 7/415; G01S 13/723

USPC .............................................. 342/36, 59, 201
See application file for complete search history.

(56) References Cited

U.S. PATENT DOCUMENTS

| | | | |
|---|---|---|---|
| 2008/0129584 A1 | 6/2008 | Antonik et al. | |
| 2012/0019407 A1* | 1/2012 | Lesturgie | G01S 13/003 342/36 |
| 2016/0252606 A1* | 9/2016 | Storz | G01S 13/282 342/201 |
| 2016/0259041 A1* | 9/2016 | Tan | G01S 13/003 |
| 2016/0266245 A1* | 9/2016 | Bharadia | G01S 13/42 |
| 2016/0291144 A1* | 10/2016 | Chang | G01S 7/03 |

OTHER PUBLICATIONS

PCT International Preliminary Report dated Mar. 26, 2020 for International Application No. PCT/US2018/050362; 9 Pages.
Response to European Rule 161/162 Communication dated Apr. 21, 2020 for European Application No. 18907487.5; Response filed Nov. 2, 2020; 11 Pages.

(Continued)

*Primary Examiner* — Bo Fan
(74) *Attorney, Agent, or Firm* — Daly Crowley Mofford & Durkee, LLP (57) ABSTRACT

Described embodiments provide systems and methods for detecting and tracking a possible threat object using a multi-static frequency diverse waveform. An example method includes receiving an indication of a possible threat object and provisioning a multi-static cluster of sensors. A set of pulses are transmitted toward the object such that each pulse is transmitted on a unique frequency and at different time slots. A set of reflected pulses are processed to detect and track the object.

8 Claims, 11 Drawing Sheets

(56) References Cited

OTHER PUBLICATIONS

European Rule 161/162 Communication dated Apr. 21, 2020 for European Application No. 18907487.5; 3 Pages.
Dai et al., "Low-sidelobe HRR Profiling Based on the FDLFM-MIMO Radar;" Proceedings of the 1$^{st}$ Asian and Pacific Conference on Synthetic Aperture Radar (APSAR); Nov. 1, 2007; pp. 132-135; 4 Pages.
Francesco, "A Comparison of Processing Approaches for Distributed Radar Sensing;" Thesis Submitted for the Degree of Doctor of Philosophy of University College London; May 27, 2009; 212 Pages.
PCT International Search Report and Written Opinion dated Oct. 18, 2019 for International Application No. PCT/US2018/050362; 16 Pages.
Caputi Jr., "Stretch: A Time-Transformation Technique;" IEEE Transactions on Aerospace and Electronic Systems, vol. AES-7, No. 2; Mar. 2, 1971; 10 Pages.
Lulu et al., "Chirp Diversity Waveform Design and Detection by Stretch Processing;" 2016 IEEE Radar Conference; May 2, 2016; 6 Pages.
Maron, "Frequency-Jumped Burst Waveforms with Stretch Processing;" IEEE International Radar Conference; May 7, 1990; 6 Pages.
Welstead, "Characterization of Diversity Approaches for LFM Stretch-Processed Waveforms;" 2007 International Waveform Diversity & Design Conference; Jun. 4, 2007; 5 Pages.

\* cited by examiner

MULTI-STATIC FREQUENCY DIVERSE WAVEFORM (MFDW)

CROSS-REFERENCE TO RELATED APPLICATION(S)

This application claims priority to and the benefit of U.S. Provisional Application No. 62/558,397, filed on Sep. 14, 2017. The entire teachings of the above application are incorporated herein by reference in its entirety.

GOVERNMENT SUPPORT

The invention was supported, in whole or in part, by N00014-16-C-2007 from the United States Department of Defense, The Naval Air Systems Command. The Government has certain rights in the invention.

BACKGROUND

A multi-static radar system includes multiple spatially diverse monostatic radar or bistatic radar components with a shared area of coverage. Multi-static radar systems attain an increased coverage area by spreading individual radar components throughout a surveillance area. The components are spread out such that targets might be viewed from different angles for the transmitter/receiver pairs. The use of multiple separate viewing angles allows the system to attain a higher effective signal-to-noise ratio for detecting and tracking an object. However, current multi-static radar systems have limited resolution and frequency diversity because they use multi-static waveforms comprising orthogonal narrow-band pulses.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Aspects of the present disclosure include multi-static radar systems that use frequency diverse waveforms to increase an effective signal-to-noise ratio for detecting and tracking an object. A frequency diverse waveform comprises a series of pulses with each pulse being transmitted at a different time slot from the other pulses and having a distinct frequency that has a minimum threshold frequency separation from the other pulses. The frequency diverse waveforms allow the multi-static radar systems described herein to achieve greater resolution capabilities (e.g., range resolution capabilities). Additionally, the systems achieve multi-pulse frequency diversity within a single receive window by transmitting pulses with different frequencies at times selected such that all the pulses' reflections are received within a single receive window of multi-static radar system. Advantageously, the aspects disclosed herein have improved range resolution and can preserve existing beamformer architectures of current sensors.

In one aspect, a method includes receiving an indication of a possible threat object and provisioning a multi-static cluster of sensors to detect and track the object. The object is detected and tracked by transmitting a set of pulses toward the threat object such that each pulse of the set of pulses is transmitted on a unique frequency and at different time slots. A set of reflected pulses is then processed, where each reflected pulse corresponds to a distinct pulse of the transmitted set of pulses.

The indication can comprise one or more of: a potential size of the threat object, an approximate range of the threat object, an approximate spatial location and/or orientation of the threat object, and a velocity of the threat object.

In an example, the multi-static sensor cluster comprises two or more sensors. The two or more sensors can be selected based on geo-locations separated by a threshold distance. Further, the sensors can be selected based on their geo-locations with respect to the potential threat object.

In an embodiment, the method further comprises assigning each sensor of the multi-static cluster a transmission time-slot that is separated from a previous transmission time-slot by a pulse width plus a time-offset. The method can also further comprise assigning each sensor of the multi-static cluster a transmission frequency that is within an instantaneous bandwidth of all the multi-static cluster of sensors. Each transmission frequency can have a frequency offset that is proportional to the time offset. Additionally, the method can comprise transmitting the set of pulses such that the set of reflected pulses are received within a single receive window.

The aspect above can include processing the set of reflected pulses at a subject sensor of the multi-static sensor cluster as follows. The method can include receiving the set of reflected pulses at each radiating element of the subject sensor. At each radiating element or set of radiating elements, the method can include generating a DC signal from the set of reflected pulses, the DC signal having n pulses at a constant frequency, where n is equal to a number of pulses included in the set of the reflected pulses. The method can further include generating a beamformed signal from all the generated DC signals, the beamformed signal comprising the n pulses. The method can then include classifying the possible threat object using the beamformed signal.

In another aspect, a sensor can comprise a scheduling processor, a transmitter system, and a receiver system. The scheduling processor is configured to provision a multi-static sensor cluster to detect and track a possible threat object. The transmitter system is configured to transmit a set of pulses toward the threat object such that each pulse of the set of pulses is transmitted on a unique frequency and at different time slots. The receiver system is configured to process the set of reflected pulses, wherein each reflected pulse corresponds to a distinct pulse of the transmitted set of pulses.

The aspect above may have one or more of the following features. The scheduling processor can be communicatively coupled to an early warning sensor from which it receives an indication of the possible threat object. The indication can comprise one or more of: a potential size of the threat object, an approximate range of the threat object, an approximate spatial location and/or orientation of the threat object, and a velocity of the threat object.

The scheduling processor can provision the multi-static sensor cluster by selecting two or more sensor that have geo-locations separated by a threshold distance and/or other criteria such as availability, advantageous viewing angle, and distance to target. The scheduling processor can be further configured to assign each sensor of the multi-static sensor cluster a transmission time-slot that is separated from a previous transmission time-slot by pulse width plus a time-offset.

The scheduling processor can also select the two or more sensors based on their respective geo-locations in relation to the potential threat object. The scheduling processor can also be configured to assign each sensor of the multi-static cluster a transmission frequency that is within the instantaneous bandwidth of all the multi-static cluster of sensors. Each transmission frequency can have a frequency offset that is proportional to the time offset.

The transmitting system can be configured to transmit the set of pulses such that the receiver system receives the set of reflected pulses within a single receive window.

The receiver system can be configured to, at the one or more radiating elements, generate a DC signal from the set of reflected pulses, the DC signal having n pulses at a constant frequency, where n is equal to a number of pulses included in the set of the reflected pulses. The receiver system can also be configured to generate a beamformed signal from all the generated DC signals, the beamformed signal comprising the n pulses. The receiver system can be configured to classify the possible threat object using the beamformed signal.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1A:
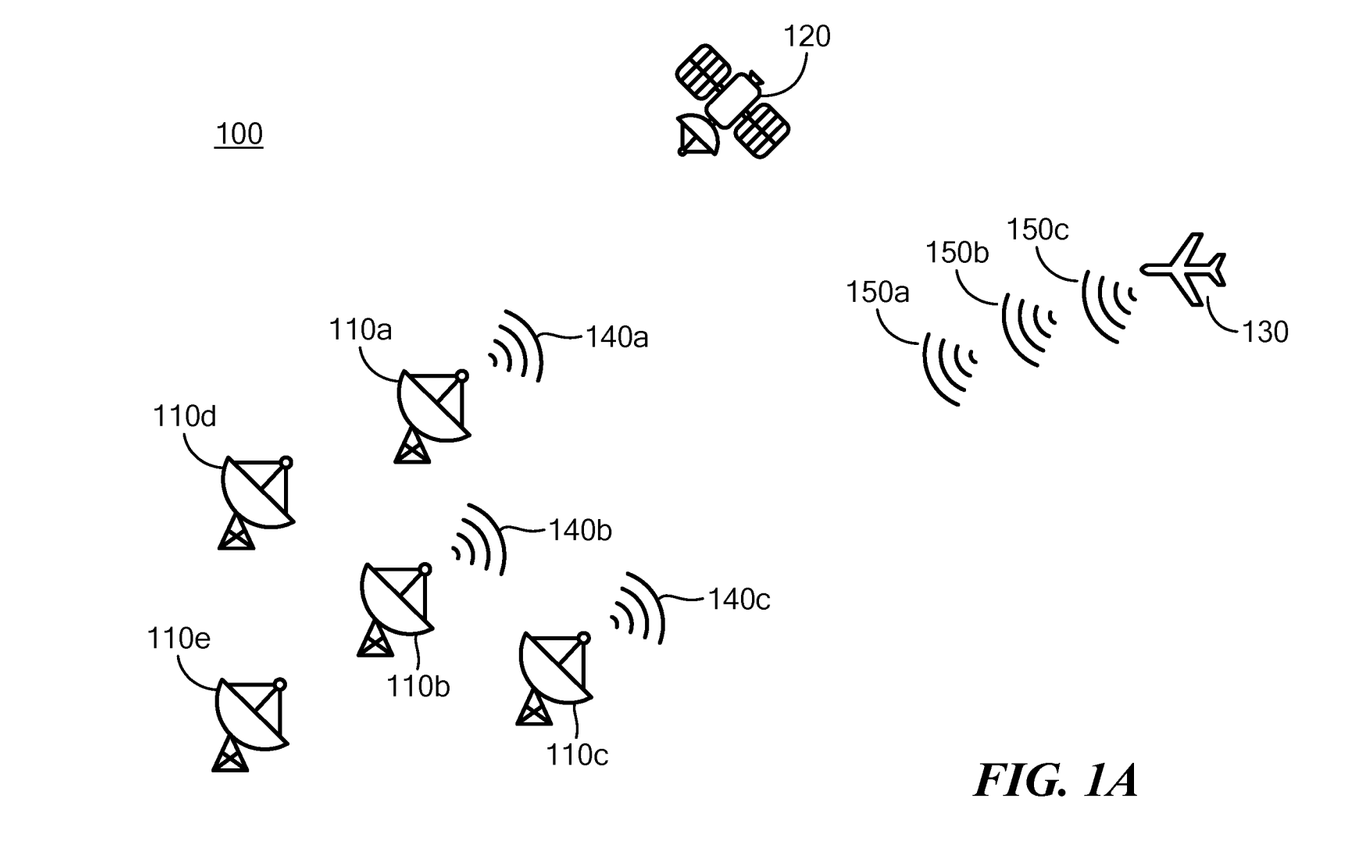
FIG. 1A illustrates an example environment in which an illustrative multi-static sensor system is used to detect and track an object in accordance with described embodiments.
Figure 1B:
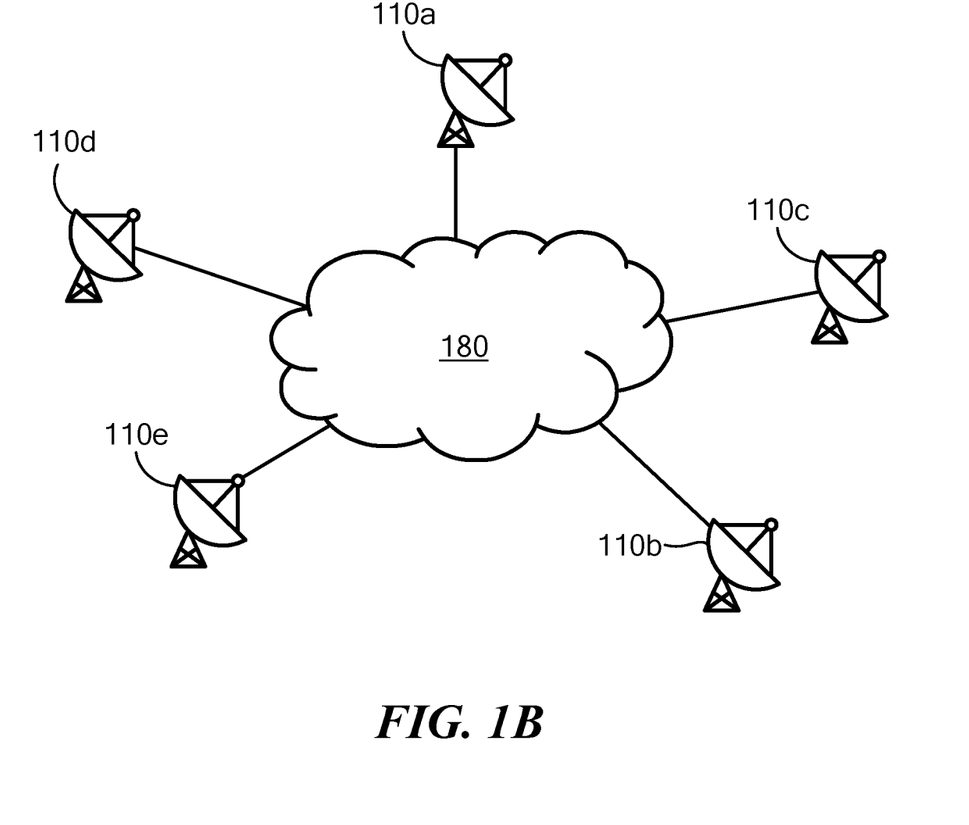
FIG. 1B illustrates an example network of sensors forming a multi-static sensor system in accordance with described embodiments.

FIGS. 1A-B show an example environment 100 that includes sensors 110a-e (e.g., radars) used to detect and track a potential threat object, such as an aircraft 130. The aircraft's remote range makes it difficult to be detected and tracked by any individual sensor of the sensors 110a-e. Accordingly, embodiments described herein perform multi-static radar operations that combine resources (e.g., energies) of a set of the sensors 110a-e to detect and track the aircraft 130.

In one embodiment, an early warning sensor 120 (e.g., a satellite) first detects the presence of the aircraft 130 and sends an early warning indication to one of the sensors (e.g., sensor 110a). The sensor 110a, acting as a master device, reviews the early warning indication and provisions additional resources (e.g., sensors 110b-c acting as slave devices), via a communications network 180, to detect and track the aircraft 130. The sensors 110a-c form a multi-static sensor cluster that generate a multi-static frequency diverse waveform (e.g., waveform 490 of FIG. 4). The multi-static frequency diverse waveform is a wideband waveform that that includes pulses 140a-c of distinct frequencies. Each of the pulses 140a-c have distinct frequencies, and each of the distinct frequencies are selected such that they have at least a minimum threshold frequency separation from each other as discussed in FIG. 4.

The sensor cluster 110a-c receives reflected pulses 150a-c. The reflected pulses 150a-c are energy reflections from the pulses 140a-c bouncing off a surface of the aircraft 130. Each sensor of the sensor cluster 110a-c processes the reflected pulses 150a-c to classify, detect, and track the aircraft 130. In some embodiments, each sensor of the sensor cluster 110a-c can combine their processing results with the other sensors of the cluster 110a-c. By sharing processing results, the cluster 110a-c can reduce errors introduced from the reflected pulses 150a-c or processing of any individual sensor. A skilled artisan would understand that such sharing is not necessary to detect and track the aircraft 130 based on the teachings contained herein, and that sharing results can further increase a multi-static radar system's signal-to-noise ratio and measurement accuracy.

Figure 2A:
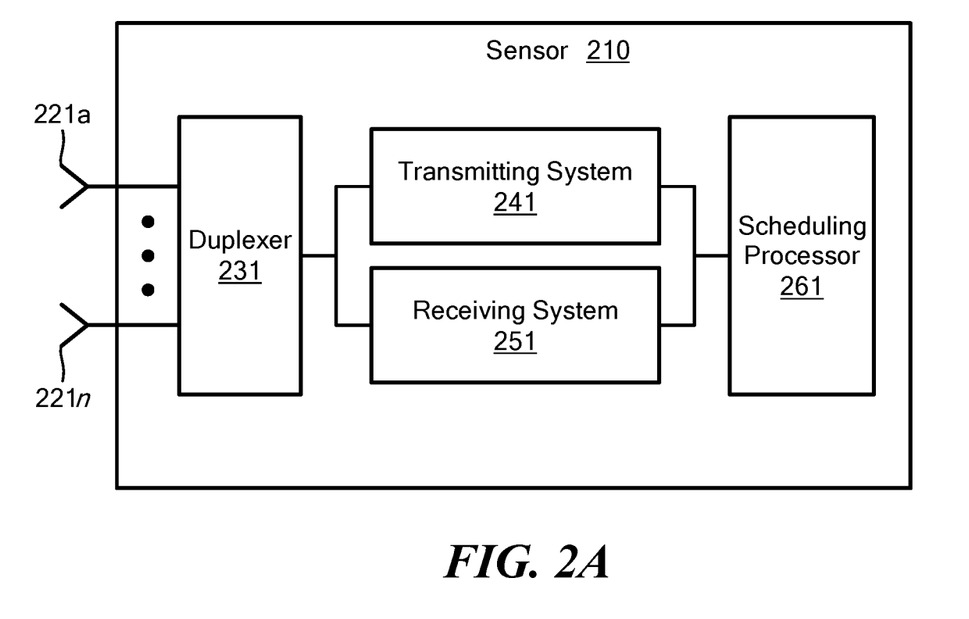
FIG. 2A is a block diagram of an illustrative sensor of a multi-static sensor system in accordance with described embodiments.
Figure 2B:
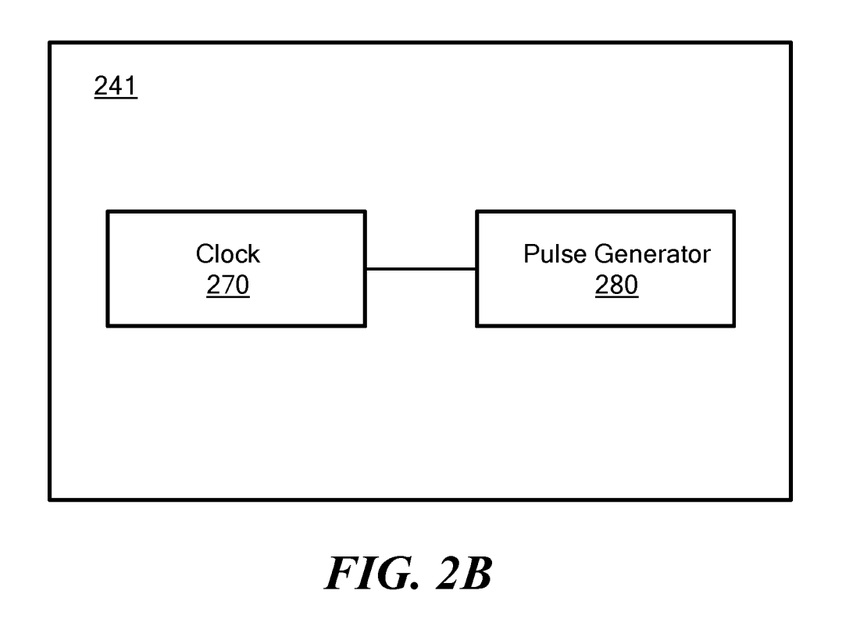
FIG. 2B is a block diagram of an illustrative transmitting system of a sensor in accordance with described embodiments.
Figure 2C:
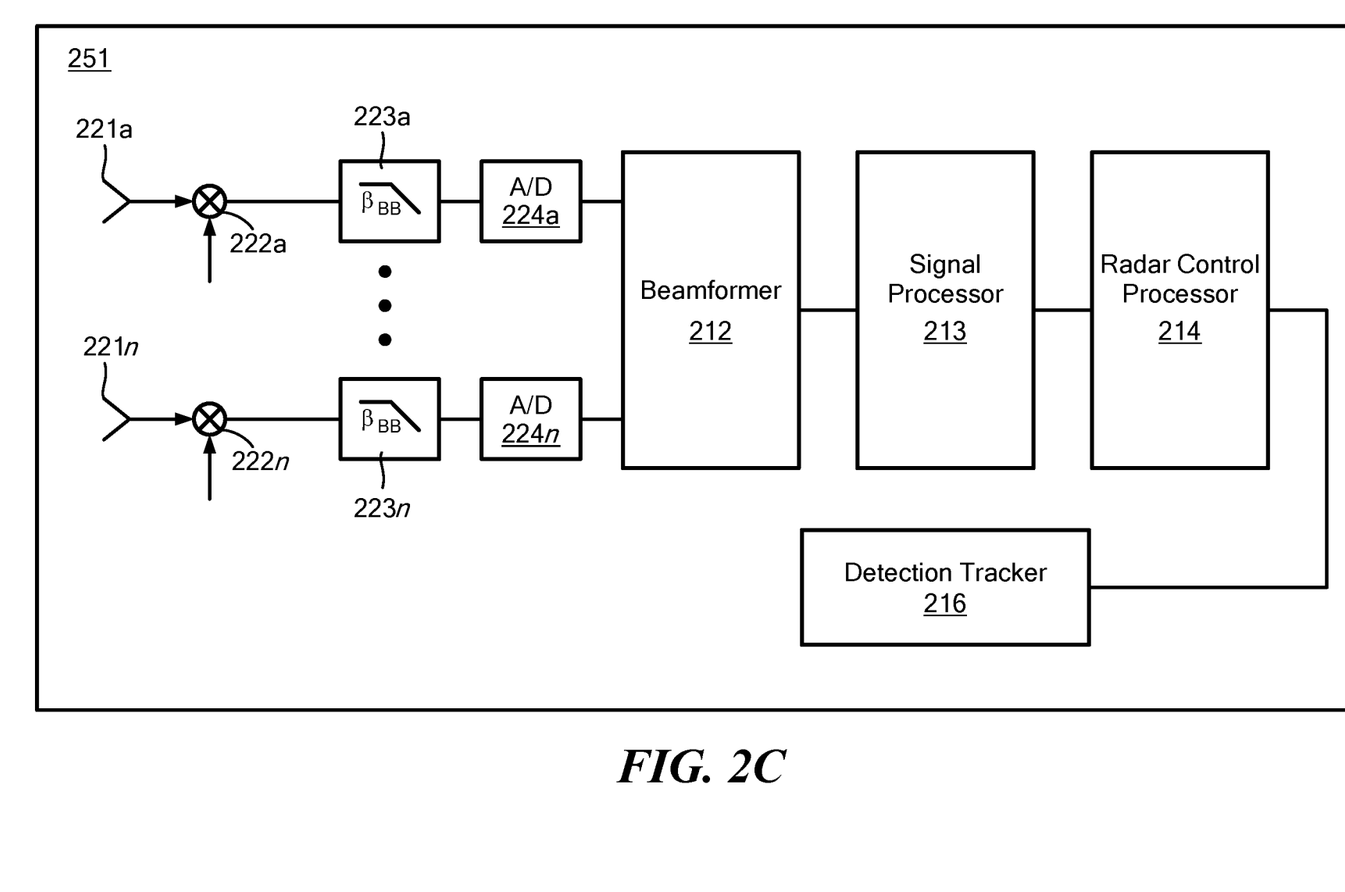
FIG. 2C is a block diagram of an illustrative receiving system of a sensor in accordance with described embodiments.

FIGS. 2A-C are block diagrams of a sensor 210 in accordance with an example embodiment of the present disclosure. The sensor 210 can be a radar (e.g., one of radars 110a-d of FIG. 1A) or any other type of sensor configured to transmit, receive, and/or process radio frequency (RF) signals. The sensor 210 comprises radiating elements 221a-n, a duplexer 231, transmitting system 241, receiving system 251, and scheduling processor 261.

The radiating elements 221a-n (FIG. 2A) are configured to radiate and/or receive RF energy. The radiating elements 221a-n can be arranged in any manner known or yet to be known. For example, the radiating elements 221a-n can be arranged in an n-dimensional array and/or matrix.

The duplexer 231 is configured to enable bi-directional communication such that the transmitting system 241 and receiving system 251 can communication over a single path. The duplexer 231 isolates the transmitting 241 and receiving system 251, while enabling them to share radiating elements 221a-n for bi-directional communication.

The scheduling processor 261 includes logic and/or circuitry (not shown) configured to receive an early warning indication from an early warning sensor (e.g., sensor 120 of FIG. 1A). The scheduling processor 261 processes information contained in the early warning indication. The information can include a potential size of a potential threat object (e.g., aircraft 130 of FIG. 1A), an approximate range of the threat object, an approximate spatial location and/or orientation of the threat object, and a velocity of the threat object. The scheduling processor 261 uses the information to provision sensors for multi-static detection and tracking of the potential threat object.

Figure 4A:
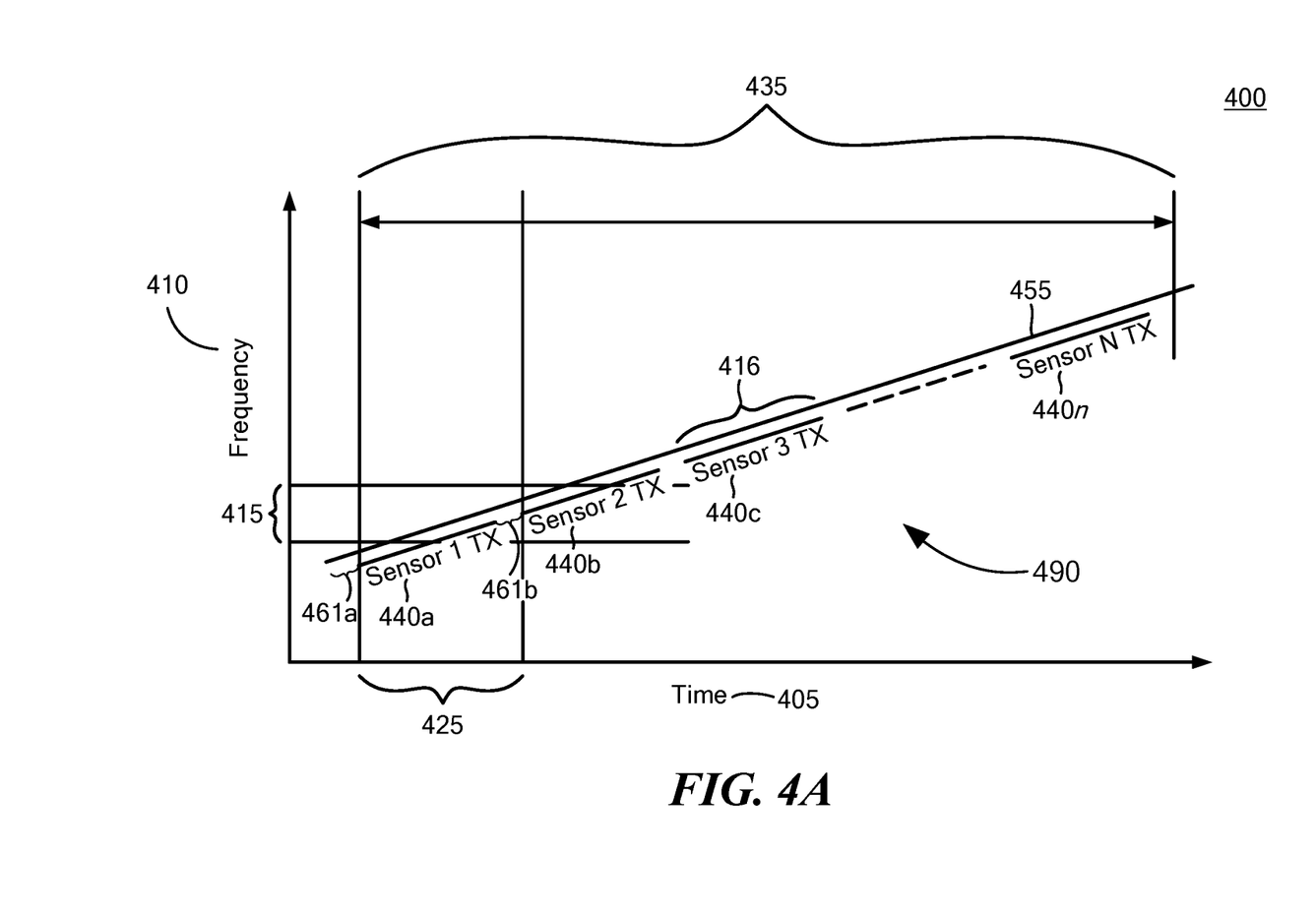
FIG. 4A illustrates transmit pulses and a de-ramp signal used to process pulse reflections in accordance with described embodiments.

FIG. 2B is a block diagram of the transmitting system 241 communicatively coupled to the scheduling processor 261 (FIG. 2A). The transmitting system 241 comprises a pulse generator 280 and clock 270. The pulse generator 280 receives command instructions from the scheduling processor 261 to generate, at a specific time slot, a wideband frequency pulse (e.g., one pulse of pulses 440a-c of FIG. 4) of a MFDW (e.g., the waveform 490 of FIG. 4). The command instructions are based on the scheduling information received from a master scheduler (e.g., the scheduling processor of sensor 110a of FIG. 1A). Using timing information received from the clock 270, the pulse generator 280 generates and transmits the pulse according the command instructions. The generation and transmission time of the pulse is selected such that the sensor 210 (FIG. 2A) transmits its pulse such that all the transmitted pulses (e.g., pulses 140a-c) propagate to the target to be coincident with a time offset as illustrated in FIG. 4A. The timing information can be based on coordinated universal time (UTC) or any other standard.

Figure 4B:
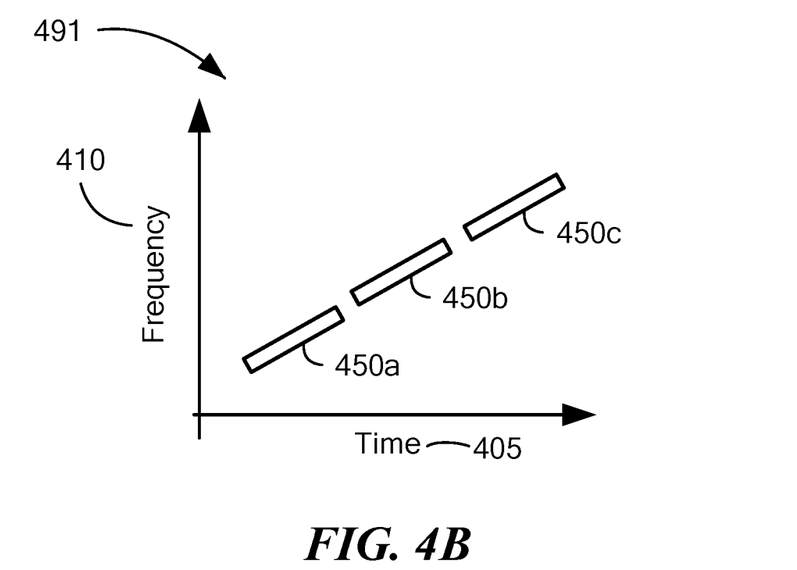
FIG. 4B illustrates a graph of reflected pulses received within a single receive window in accordance with described embodiments.

FIG. 2C is a block diagram of the receiving system 251 of sensor 210 (FIG. 2A) that receives reflected pulses (e.g., reflected pulses 450a-c of FIG. 4B) forming a receive signal (e.g., the receive signal 491 of FIG. 4B). The receiving system 251 includes antenna elements 221a-n (or groups of elements). Each of the antenna elements 221a-n is communicatively coupled to respective receiving elements that include mixers 222a-n, low-pass filters 223a-n, and analog-to-digital (A/D) converters 224a-n. The outputs of all the A/D converters 224a-n are communicatively coupled to a beamformer 212. The beamformer 212 begins a processing chain that includes a signal processor 213, radar control processor 214, and detection tracker 216. The combination of the receiving elements and processing chain elements perform stretch processing on the received reflected pulses to detect and track a possible threat object (e.g., the aircraft 130 of FIG. 1A). Stretch processing includes (i) receiving time dispersed and frequency diverse pulses, (ii) mixing the received pulses with a de-chirping signal, and (iii) low-pass filtering the de-chirped signals. Stretch processing yields a set of signals (one per multi-static sensor in the cluster) with a frequency offset proportional to the range of the possible threat object. This frequency offset is the difference between an instantaneous frequency of the received signal and the de-chirping signal, caused by the relative rime delay of the received signal (see FIG. 4A). Because time delay is due to the round-trip propagation time to/from the target, it is proportional to the target range.

The reflected pulses are received within a single receiving window (e.g., window 435 of FIG. 4A) by each of the antenna elements 221a-n. Using mixers 222a-n, the receive signal formed from the reflected pulses is mixed with a de-chirp (e.g., a de-ramp) signal (e.g., the de-ramp signal 455 of FIG. 4A) that has a slope equivalent to the chirp slope of the MFDW 490 of FIG. 4A. Additionally, the de-chirp signal has a duration that is greater than the MFDW 490. The mixers' output is passed to the rest of the receiving elements or groups of elements (i.e., low pass filters 223a-n and A/D converters 224a-n). Each of the receiving elements output de-ramped signals (e.g., the de-ramped signal 492 of FIG. 4C) comprising an n-series of pulses separated in time at a constant frequency. The n-series of pulses is equivalent to the number of received reflected pulses (e.g., 3 in this example). The de-ramped signal has a constant frequency because each of the n-pulses' frequency is proportional to the potential threat object's range.

The de-ramped signals are passed to the beamformer 212. The beamformer 212 generates a beamformed signal from all the de-ramped signals. The beamformed signal can be defined as a single signal that is a beam cluster of all the de-ramped signals. The beamformed signal also comprises an n-series of pulses separated in time at a constant frequency.

The beamformed signal is passed to the signal processor 213. The signal processor 213 splits the beamformed signal using a time division processing technique that splits the signal to create n-time divided signals (e.g., signals 452a-c of FIG. 4D). The n-time divided signals are passed to the radar control processor 214 which performs Discrete Fourier Transform (DFT) on the signals such that they are converted into discrete frequency signals (e.g., signals 453a-c of FIG. 4D). As illustrated in FIG. 4D, the FFT signals 43a-c are not aligned. Accordingly, the radar control processor 214 then performs range alignment and non-coherent integration on the discrete frequency signals to generate a non-coherently integrated range-aligned graph. The range aligned graph is passed to the detection tracker 216 to classify the threat object. Range alignment accounts for each sensor's relative motion of the multi-static sensor cluster. Range alignment also accounts for non-linear range-angle coupling from each sensor's different viewing angles. Accordingly, each of the discrete frequency signals are quadratically aligned prior to non-coherent integration. The quadratically aligned signals are then non-coherently integrated. The classification can include information identifying the type of object, range, and velocity of the threat object.

In some examples, each of the sensors of the multi-static sensor cluster can pass their respective range aligned signals to the other sensors of the cluster via a communication network (e.g., the network 180 of FIG. 1B). Each sensor's radar control processor 214 can then combine the signals to form an aggregated range-aligned signal, which is used by each sensor's detection tracker 216 to classify the threat object.

Figure 2D:
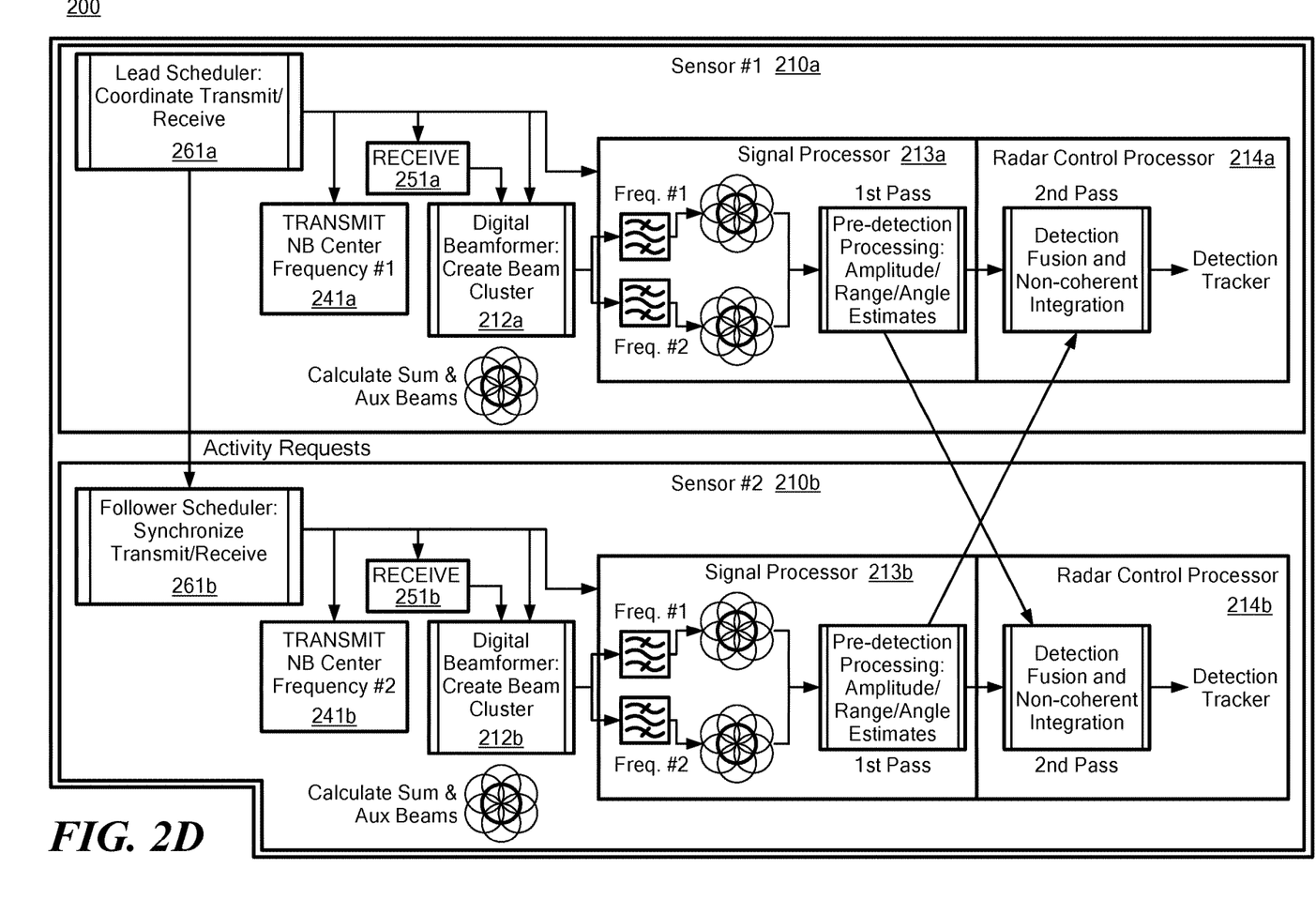
FIG. 2D is a block diagram of an illustrative coordinated receiving system of a multi-static sensor cluster in accordance with described embodiments.

FIG. 2D is a block diagram of a multi-static sensor cluster 200 in accordance with described embodiments. The cluster 200 includes a first sensor 210a and a second sensor 210b. The sensors 210a-b include, respectively, schedulers 261a-b, transmitters 241a-b, receivers 251a-b, beamformers 212a-b, signal processors 213a-b, and radar control processors 214a-b.

In this example, the first sensor's scheduler 261a acts as a lead scheduler because it receives an early warning indication from an early warning sensor (e.g., the satellite 120 of FIG. 1A). The lead scheduler 261a provisions the second sensor 210b to assist the first sensor 210a to detect, track, and identify a potential threat object (e.g., the aircraft 130 of FIG. 1a) identified in the early warning indication. The lead scheduler 261a can provision the sensors 210a-b to form a multi-static sensor cluster according to the method 300 of FIG. 3A.

Each of the sensors 210a-b transmit radar signals toward the threat object based on scheduling information provided by the lead scheduler 261a. In this example, the first sensor's transmitter 241a transmits a first radar signal having a first center frequency, and the second sensor's transmitter 241b transmits a second radar signal at a second center frequency. Both sensors' receivers 251a-b then receive the RF energy. The RF energy is reflected energy of each transmitted radar signal. The beamformer's 212a-b of the sensors 210a-b then beamform the received RF energy producing a beamformed signal. The signal processors 213a-b receive the beamformed signals and process the signals according to the method 301 of FIG. 3B. The signal processors 213a-b then pass a processed signal to the radar control processors 214a-b which process the processed signal according to the method 302 of FIG. 3C.

Figure 3A:
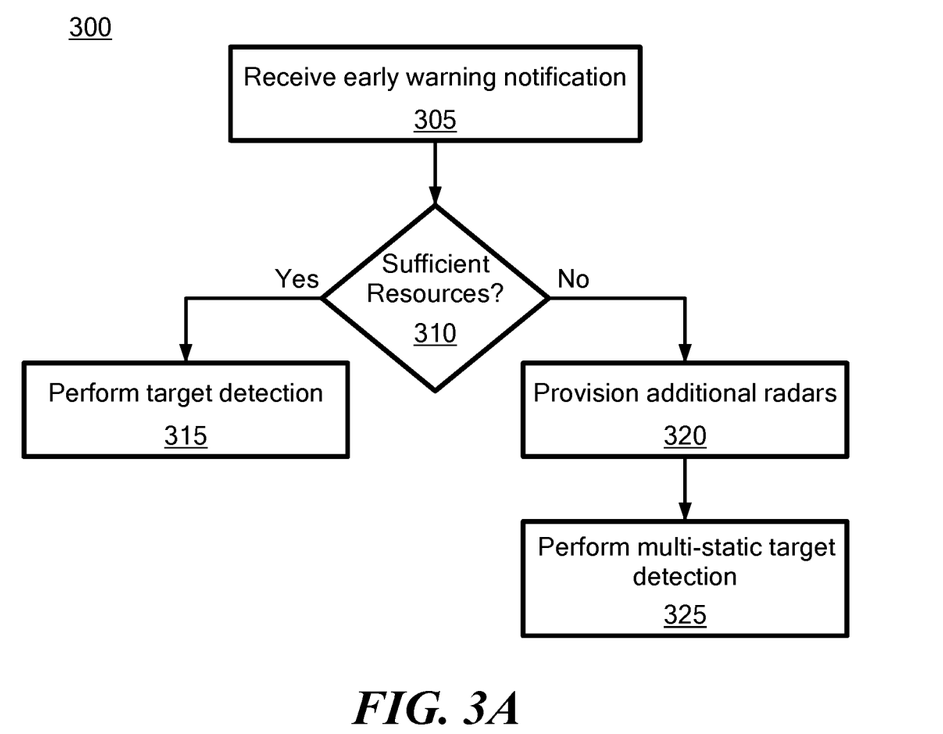
FIG. 3A is a flow diagram of an example method of provisioning sensors for multi-static detection and tracking of an object in accordance with described embodiments.

FIG. 3A illustrates an example method 300 to provision sensors. At 305, a sensor (e.g., the sensor 110a of FIG. 1A) receives an early warning notification that is processed by its scheduling processor (e.g., the scheduling processor 261 of FIG. 2A). At 310, the scheduling processor uses information contained in the notification to determine if the sensor, individually, has enough resources to detect and track the potential threat object. If the sensor has enough resources, at 315, the sensor performs target detection and tracking. If the sensor, individually, does not have enough resources to detect and track the potential threat object, the scheduling processor provisions additional sensors (e.g., the sensors 110b-c of FIG. 1A) to help detect and track the potential threat object. The scheduling processor transmits scheduling information to the additional sensors to form a sensor cluster. The scheduling information enables the cluster to that transmit a multi-static frequency diverse waveform (MFDW) (e.g., the waveform 490 of FIG. 4) that includes a plurality of pulses (e.g., pulses 440a-n of FIG. 4). The scheduling information can be passed between sensors using a wired or wireless network (e.g., the network 180 of FIG. 1B). In the example environment of FIG. 1A, the scheduling information includes sensor identification information for the additional sensors 110b-c, which act as slave devices controlled by a master (e.g., sensor 110a). The scheduling information allocates each sensor a wideband frequency and transmission time as illustrated by the graph of FIG. 4.

The sensors forming a multi-static cluster, at 325, then perform multi-static target detection and tracking in two stages. In the first stage, each sensor transmits, at a scheduling time slot, a pulse such that the combination of pulses transmitted from each sensor form a MFDW (e.g., the waveform 490 of FIG. 4). The pulses are transmitted from each sensor and propagate to the target, with transmit times coordinated so that the pulses reflect off the target in sequence as illustrated n FIG. 4.

Additionally, each pulse has a frequency offset that is proportional to the time offset. In the second stage, each sensor receives all pulse reflections within a receive window (e.g., the window 435 of FIG. 4), and processes the reflected pulses (e.g., pulses 150a-c of FIG. 1A) using their respective receiving systems (e.g., receiving system 251 of FIG. 2C).

Figure 3B:
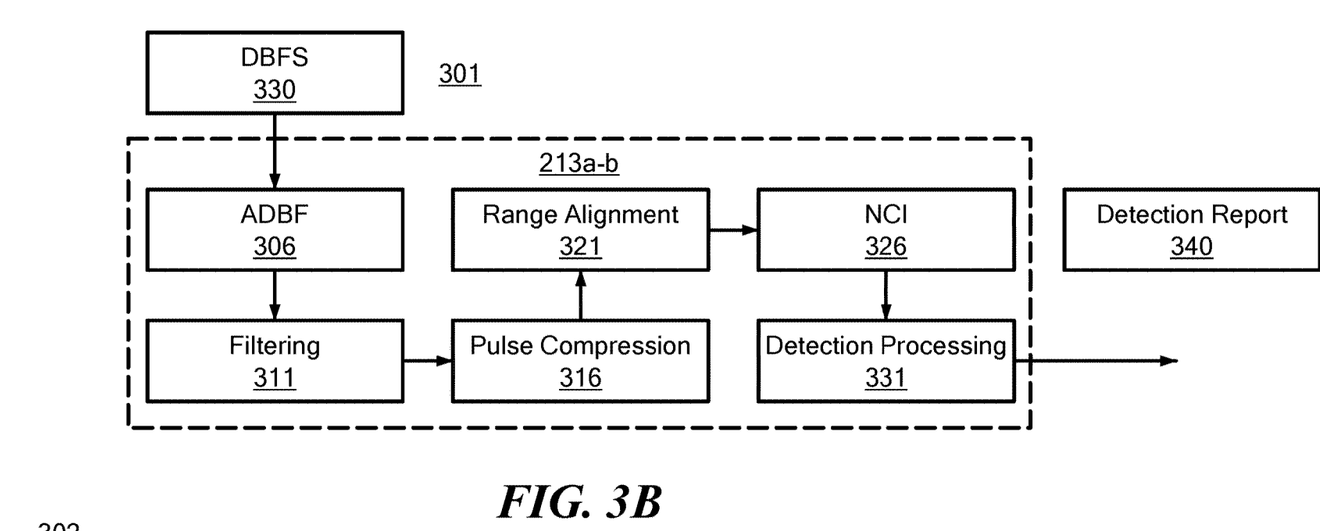
FIG. 3B is a flow diagram of an example method of signal processing steps performed by a multi-static sensor cluster in accordance with described embodiments.

FIG. 3B is a flow diagram of a method 301 performed by one or more signal processors (e.g., the signal processors 213a-b of FIG. 2D) for processing digital beamformed signals (DBFS) 330 generated by beamformers (e.g., beamformers 212 of FIG. 2D). At 306, the method 301 includes performing adaptive digital beamforming (ADBF) on the DBFS 330. The method 301, at 311, the filters the adapted DBFS into sub-bands that contain n-time divided signals. At, 316, the method 301 includes pulse compressing the n-time divided signals. The method 301, at 321, range aligns the pulse compressed signals. At 326, the method 301 performs non-coherent integration (NCI) on the range aligned signals. The method 301, at 331, performs detection processing to generate a detection report 340 that contains range-angle measurement data for the potential threat object detected by the DBFS 330.

Figure 3C:
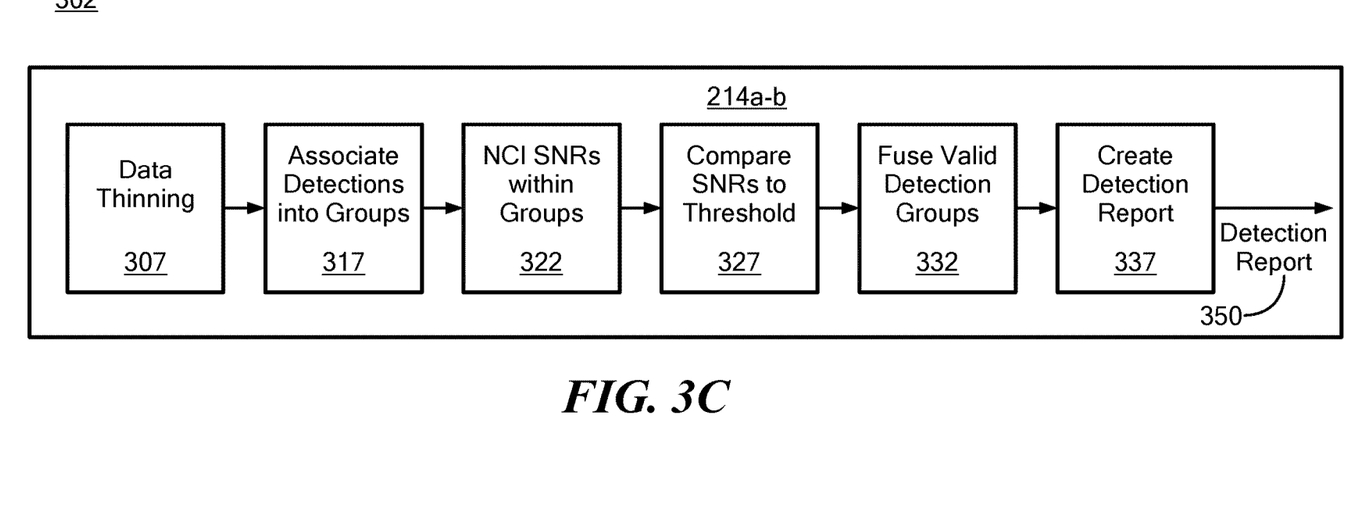
FIG. 3C is a flow diagram of a method for multi-static cluster detection association and fusion in accordance with the described embodiments.

FIG. 3C is a method 302 for combining the detection reports (e.g., the detection report 340 of FIG. 3B) from the n-sensors in the multi-static cluster as performed by the radar control processors 214a-b (FIG. 2D). The method 302, at 307, includes data thinning a total number of detection reports shared across the multi-static sensor cluster (e.g., the sensors 210a-b of FIG. 2D). The data thinning is based on available throughput and latency of a communication network (e.g., the network 180 of FIG. 1B) formed the sensor cluster. At 317, the method 302 includes associating the detections of the remaining detection reports into groups based on the likelihood that they are from the same object. At 322, the method 302 noncoherently integrates the groups, which are then tested for significance at 327. Significant groups, at 332, are fused for improved measurement accuracy and, at 337, are passed on to a radar tracker (e.g., the detection tracker 216 of FIG. 2C) as a merged detection report 350.

FIG. 4A illustrates an example multi-static frequency diverse waveform (MFDW) 490 comprising a series of pulses 440a-n. A scheduling processor (e.g., the scheduling processor 261 of FIG. 2A) selects each of the transmission pulses 440a-n as a function of frequency 410 and time 405. Each of the pulses 440a-n has a frequency separation, Δf 415, as defined by the following equation:

$$\Delta f \geq BW + \frac{2}{c}\frac{RW}{PW} > c/2L_{target}, \quad \text{(EQ. 1)}$$

where BW is a chirp bandwidth (e.g., the bandwidth of one of the pulses 440a-n), c is the speed of light, RW is receive window 435, PW is pulse width 416, and $L_{target}$ is a nominal target length.

The pulses 440a-n form an MFDW 490 that has a chirp slope that is a function of the frequency bandwidth and the pulse width of each pulse (e.g., chirp slope=BW/PW). Each sensor is assigned a frequency 410 and transmission time 405 such that reflections of the transmitted pulses 440a-n are all received within a single receive window (RW) 435. RW can be defined by the following equation:

$$\frac{c}{2}N\Delta t \leq RW \leq \frac{c}{2}PW\frac{BW_{RCVR}}{BW_{SubPulse}}, \quad \text{(EQ. 2)}$$

where N is a number of transmit pulses, c is the speed of light, PW is pulse width 416, $BW_{RCVR}$ is a sensor's instantaneous bandwidth, $BW_{SUBPulse}$ is a chirp bandwidth (e.g., one of the pulses 440a-n), and Δt is a time offset and can be defined by the following equation:

$$\Delta t \geq PW + \frac{2}{c}RW, \quad \text{(EQ. 3)}$$

where PW pulse width 416, c is the speed of light, and RW is the receive window 435. Additionally, each pulse is separated by a distance 425. In this example, the distance 425 is defined as a pulse width 416 plus a time offset, $\Delta t$, 461*b*. Each pulse 440*a-n* includes a leading gap 461*a* and trailing gap 461*b* substantially equal to $\Delta t$ to account for a receive window size 435.

FIG. 4B illustrates a graph of a receive signal 491 that comprises pulse reflections 450*a-c* that are energy reflection of transmitted pulses (e.g., the pulses 440*a-c* of FIG. 4A). The pulse reflections 450*a-c* are received within a single receive window (e.g., the receive window 435 of FIG. 4A). The pulse reflections 450*a-c* are received by a sensor (e.g., the sensor 210 of FIG. 2A) at times that are proportional to the range to the threat object. Additionally, the pulse reflections 450*a-c* have frequencies that are proportional to the frequencies of the transmitted pulses.

Figure 4C:
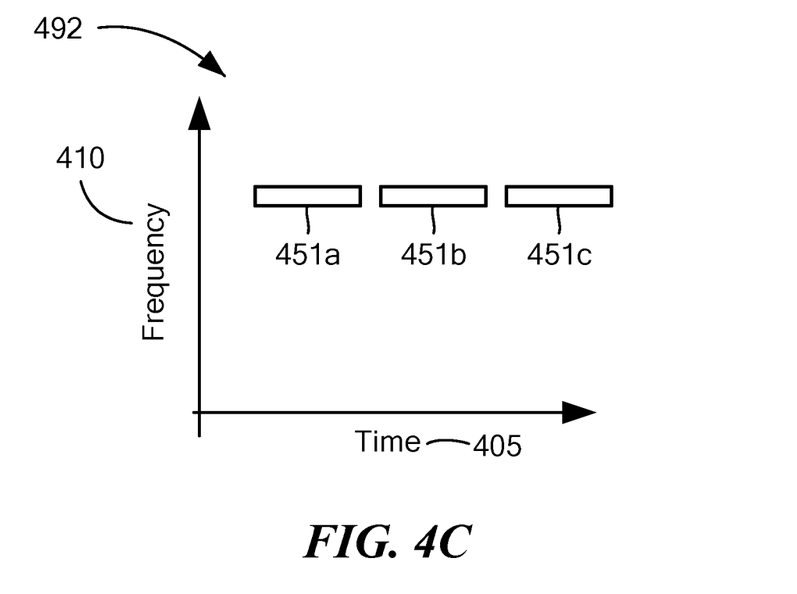
FIG. 4C illustrates a graph of a de-ramped signal generated from a series of received pulses.
Figure 4D:
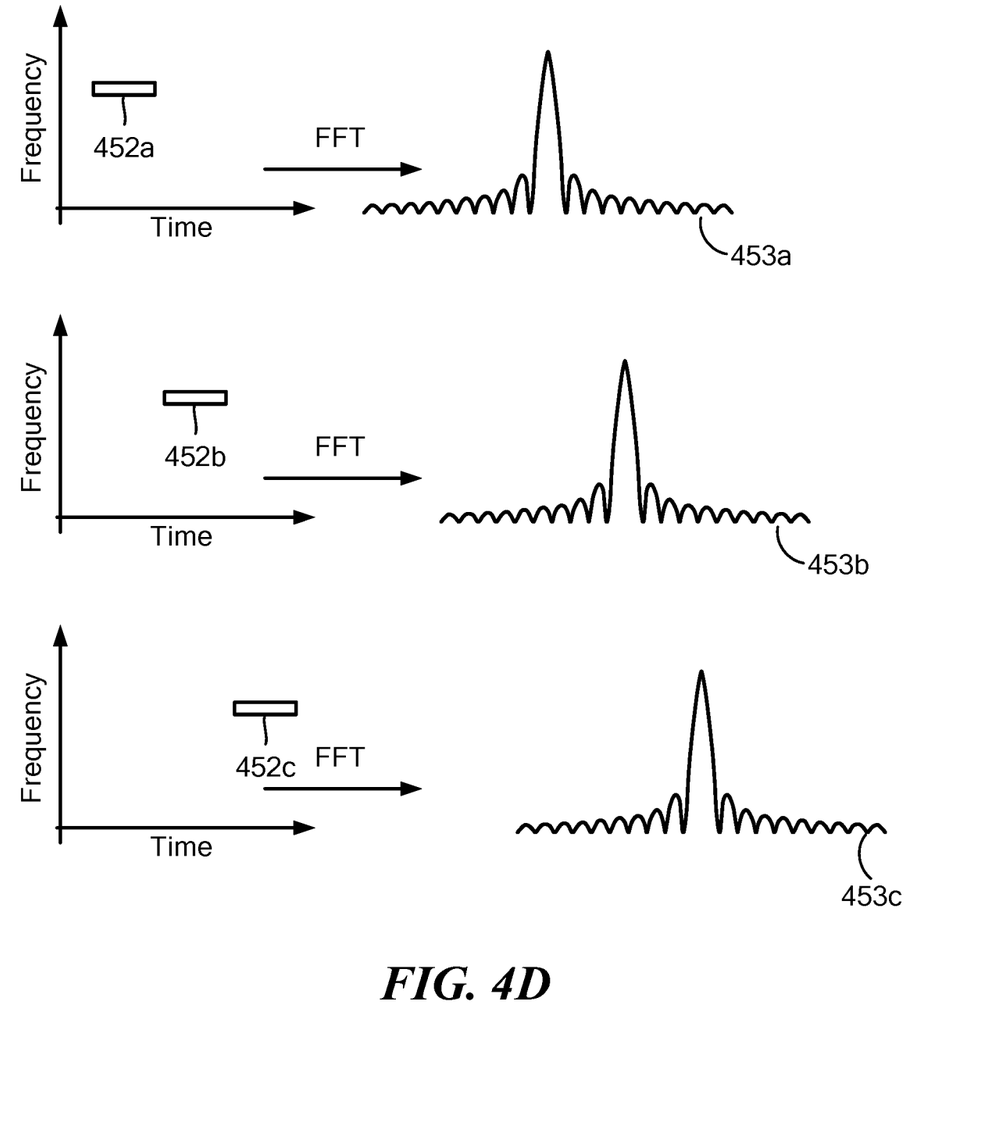
FIG. 4D illustrates time-divided graphs of the de-ramped signal of FIG. 4C and their respective Frequency Fourier Transforms (FFTs).

FIG. 4C illustrates a graph of a de-ramped signal 492 generated from a receive signal (e.g., receive signal 491 formed from pulse reflections 450*a-c* of FIG. 4B) and a de-chirp signal (e.g., the de-chirp signal 455 of FIG. 4A). Specifically, the receive signal is mixed with the de-chirp signal such that the de-ramped signal 492 comprises pulses 451*a-c* each having a constant frequency.

Figure 5:
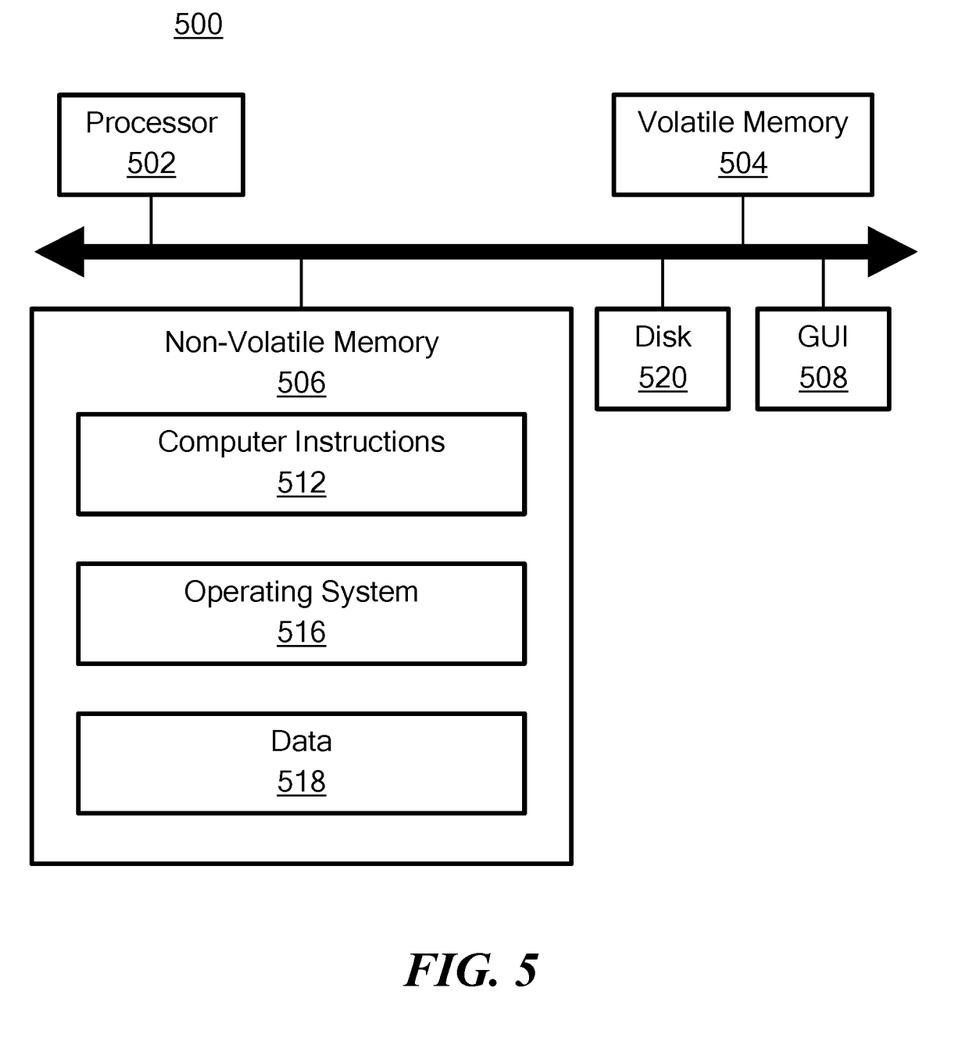
FIG. 5 is a block diagram of an embodiment of a system for generating and processing a multi-static frequency diverse waveform in accordance with the techniques described herein.

Referring now to FIG. 5, a computer 500 includes a processor 502, a volatile memory 504, a non-volatile memory 506 (e.g., hard disk), a graphical user interface (GUI) 508 (e.g., a mouse, a keyboard, a display, for example) and a computer disk 520. The non-volatile memory 506 stores computer instructions 512, an operating system 516 and data 518. In an embodiment, the data 518 may include data collected corresponding to signals transmitted and/or received a transceiver system (e.g., transmitting system 241 and receiving system 251 of FIG. 2A). The data 518 may include multi-static frequency diverse waveform (MFDW) information and corresponding scheduling information. For example, the data 518 can include pulse width information, frequency information, early warning information, and/or timing information.

In some embodiments, non-volatile memory 506 may include one or more look-up tables for transmitting, storing, organizing, and processing captured data corresponding to signals transmitted and/or received by the transceiver system. In one example, the computer instructions 512 are executed by the processor 502 out of volatile memory 504 to perform all or part of the method (or process) 300 of FIG. 3.

In an embodiment, computer 500 may be the same as or substantially similar to each of the components of sensor 210 of FIGS. 2A-C, such as transmitting system 241, receiving system 251, and scheduling processor 261. Computer 500 may be the same as or substantially similar to each of the components of transmitting system 241 of FIG. 2A, such as pulse generator 280 and clock 270. Computer 500 can also be the same as or substantially similar to each of the components of receiving system 251 of FIG. 2C, such as mixers 223*a-n*, low-pass filers 223*a-n*, A/D converters 224*a-n*, beamformer 212, signal processor 213, radar control processor 214, and detection tracker 216. For example, computer 500 may be configured to generate, transmit, receive, and process MFDW signals for object detection and tracking.

Methods 300-302 are not limited to use with the hardware and software of FIG. 5; and may find applicability in any computing or processing environment and with any type of machine or set of machines that can run a computer program. Methods 300-302 may be implemented in hardware, software, or a combination of the two. Methods 300-302 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform methods 300-302 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. Alternatively, the system may be implemented, at least in part, as firmware.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform method 300. Method 300 may also be implemented as a machine-readable storage medium, configured with a computer program, where upon execution, instructions in the computer program cause the computer to operate in accordance with method 300.

Method 300 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method comprising:
  receiving an indication of a possible threat object; and
  provisioning a multi-static cluster of sensors to detect and track the possible threat object by:
    transmitting a set of pulses toward the threat object such that each pulse of the set of pulses is transmitted on a unique frequency and at different time slots, wherein the pulses in the set of pulses do not overlap in frequency, and
    processing a set of reflected pulses, wherein each reflected pulse corresponds to a distinct pulse of the set of pulses,
    wherein the transmitting the set of pulses toward the threat object comprises transmitting the set of pulses such that the set of reflected pulses are received within a single receive window to achieve multi-pulse frequency diversity.

2. The method of claim 1, wherein the indication comprises one or more of: a potential size of the threat object, an approximate range of the threat object, an approximate spatial location and/or orientation of the threat object, and a velocity of the threat object.

3. The method of claim 1, wherein the multi-static cluster of sensors comprises two or more sensors.

4. The method of claim 1, wherein provisioning the multi-static cluster of sensors comprises selecting sensors with geo-locations separated by a threshold distance.

5. The method of claim 1 further comprising assigning each sensor of the multi-static cluster a transmission time-slot that is separated from a previous transmission time-slot by pulse width plus a time-offset.

6. The method of claim 5 further comprising assigning each sensor of the multi-static cluster a transmission frequency that is within an instantaneous bandwidth of all the multi-static cluster of sensors.

7. The method of claim 6, wherein each transmission frequency has a frequency offset that is proportional to the time offset.

8. The method of claim 1 further comprising processing the set of reflected pulses at a subject sensor of the multi-static cluster by:
  receiving the set of reflected pulses at each radiating element of the subject sensor;
  at each radiating element, generating a DC signal from the set of reflected pulses, the DC signal having n pulses at a constant frequency, where n is equal to a number of pulses included in the set of the reflected pulses;

generating a beamformed signal from all the generated DC signals, the beamformed signal comprising the n pulses; and classifying the possible threat object using the beamformed signal.

\* \* \* \* \*